May 30, 1950 R. EDGAR 2,510,013
RIDER PROPELLED VEHICLE
Filed June 25, 1946 3 Sheets-Sheet 1

INVENTOR
Robert Edgar
BY Edwin D. Jones.
ATTORNEY

May 30, 1950  R. EDGAR  2,510,013
RIDER PROPELLED VEHICLE
Filed June 25, 1946  3 Sheets-Sheet 2

INVENTOR
Robert Edgar
BY
ATTORNEY

May 30, 1950  R. EDGAR  2,510,013
RIDER PROPELLED VEHICLE
Filed June 25, 1946  3 Sheets-Sheet 3

INVENTOR
Robert Edgar
BY Edwin D. Jones
ATTORNEY

Patented May 30, 1950

2,510,013

UNITED STATES PATENT OFFICE 2,510,013

RIDER-PROPELLED VEHICLE

Robert Edgar, Los Angeles, Calif.; Robert T. Edgar, administrator of said Robert Edgar, deceased, assignor to Robert T. Edgar as an individual Application June 25, 1946, Serial No. 679,149

10 Claims. (Cl. 280—234)

My invention relates generally to rider-propelled vehicles such as bicycles, tricycles, and the like, and more particularly to a vehicle which the rider steers with his hands and propels by his hands and feet.

In bicycles of the type most commonly in use only a small part of the human energy available for propulsion is utilized, the rider using his leg muscles for the major effort of propelling the vehicle while the muscles of his back, chest, and arms are assigned to the minor effort of steering. Furthermore no utilization is made of the rider's weight except for balancing and when the rider rises from his seat to perform the act commonly known as pumping; and the prevalence of pumping when quick acceleration is desired or when a grade is to be climbed, illustrates the advantage to be gained when both the upper-body muscles and the upper-body weight are also employed for propulsion. I have disclosed a form of bicycle in which the rider uses his upper-body muscles and weight, as well as his legs, for propelling the vehicle, in my United States Patent No. 608,190, issued to me on August 2, 1898, but in the vehicle therein disclosed steering is effected by the rotation of grips on the ends of manual levers or handle-bars, the levers as a whole being capable of movement only in vertical planes instead of being swung in the conventional horizontal plane. Consequently, in that vehicle, no utilization was made of the instinctive movements which a rider makes with his arms to regain balance when a fall is impending. By instinct and by training a rider will, when for example falling towards the left, bring his left arm close to his body and throw his right arm away from his body to restore his balance. In the conventional method of steering a bicycle, such a movement turns the weight toward the left, and equilibrium is restored by centrifugal force.

Also, in the form of vehicle disclosed in my hereinbefore mentioned patent, the manual levers made two complete cycles, that is to say, they made two upward strokes and two downward storkes, for each cycle of the pedal mechanism, requiring an excessive bobbing of the body when pedalling at high speed.

It is a purpose of my invention to provide a vehicle in which propulsion by the feet is assisted by movement of manually operated levers in one plane and in which steering is effected by movement of the same manual levers in another plane.

Another purpose of my invention is the provision of a bicycle equipped with manually operated levers which, by movement in different planes, will effect both the propulsion and the steering of the bicycle.

Yet another purpose of my invention is to provide a bicycle having dual steering means, one of which is operable in connection with pedals to propel the bicycle and the other of which is operable independently of the pedals to permit propulsion of the bicycle by the pedals alone.

A further purpose of my invention is to provide in a bicycle a steering mechanism acting on the pedal mechanism to propel the bicycle and so connected thereto that each mechanism is at its most efficient point of leverage when the other is at its dead-center or least efficient point, and in which the aforesaid connection is accomplished by simple linkage of connecting rods and levers without the use of gears or chains.

Another purpose of my invention is the provision of steering mechanism for a vehicle of the type described in which two levers act jointly to assist in propelling the vehicle and either lever may be used individually or in concert with the other to steer the vehicle.

Still another purpose of my invention is to provide a manu-pedo propelled vehicle in which one cycle of the manual levers coincide with one cycle of the pedals.

Broadly stated my invention embodies a pair of handle bars or manual levers mounted on the end of a shaft so as to give the shaft an oscillatory rotation as the levers are moved up and down, the shaft being parallel to the axis of the pedal sprocket of a bicycle and connected to the sprocket by a linkage of lever arms and connecting rods which includes one of the pedal cranks. The manual levers are pivotable on the ends of the shaft and are also pivotally connected to the ends of steering connecting rods which by a double crank mechanism control the turning of the front wheel. Because of the pivotal connection to the shaft, the manual levers may be operated in either of two planes which are substantially perpendicular to each other, or moved up or down and in or out simultaneously, and because of the double crank mechanism they may be operated independently in the plane in which they control the steering.

I will describe one form of mechanism embodying my invention and will then point out the novel features thereof in claims appended to this specification.

Figure 1:
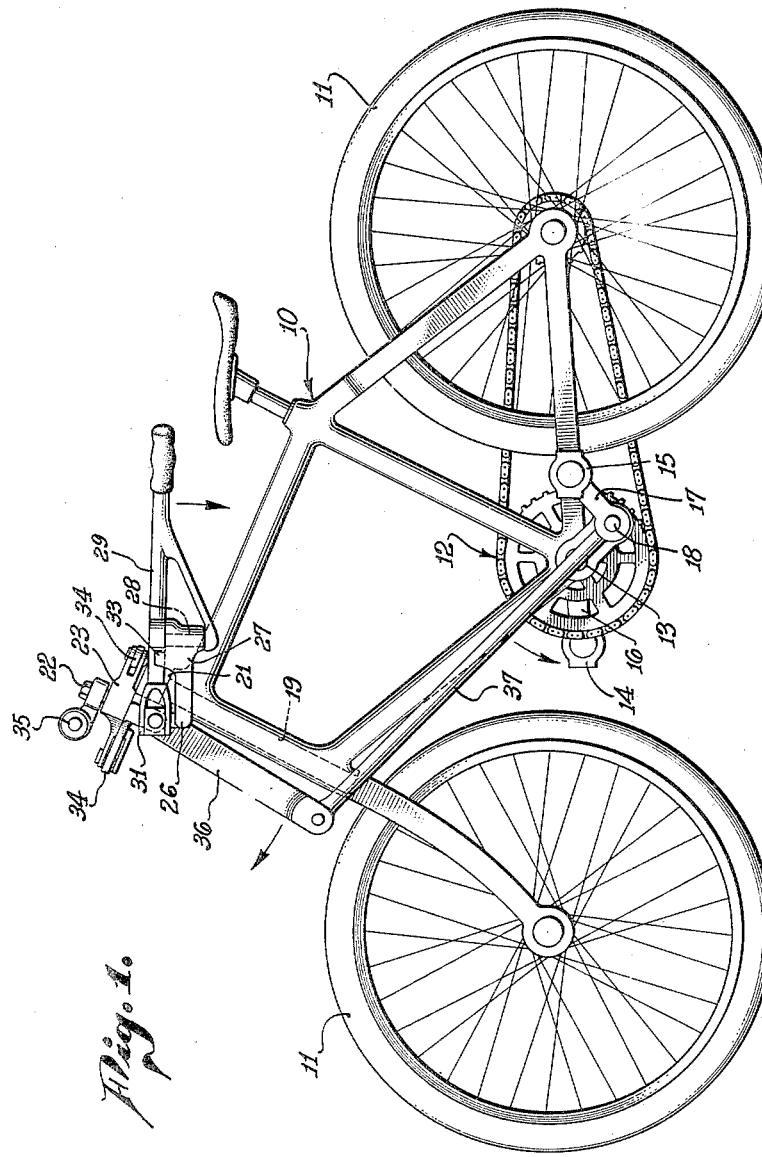
Fig. 1 is a side elevational view of a bicycle according to my invention, showing the manual levers in their uppermost position.
Figure 2:
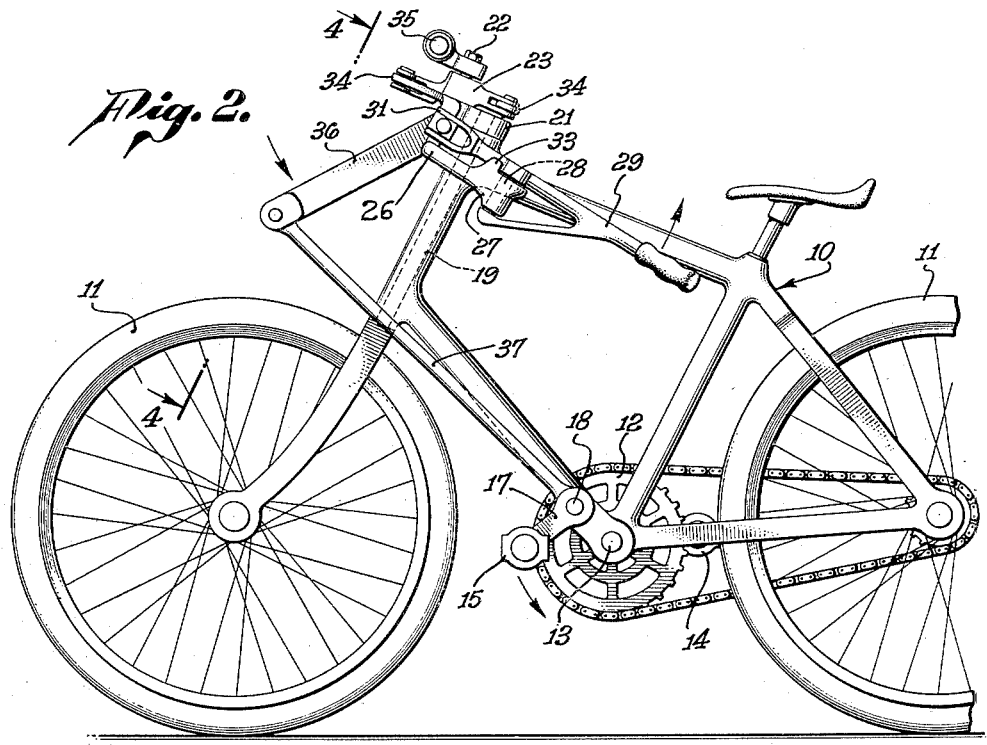
Fig. 2 is a fragmentary elevational view similar to Fig. 1, but showing the manual levers in their lowest position.
Figure 3:
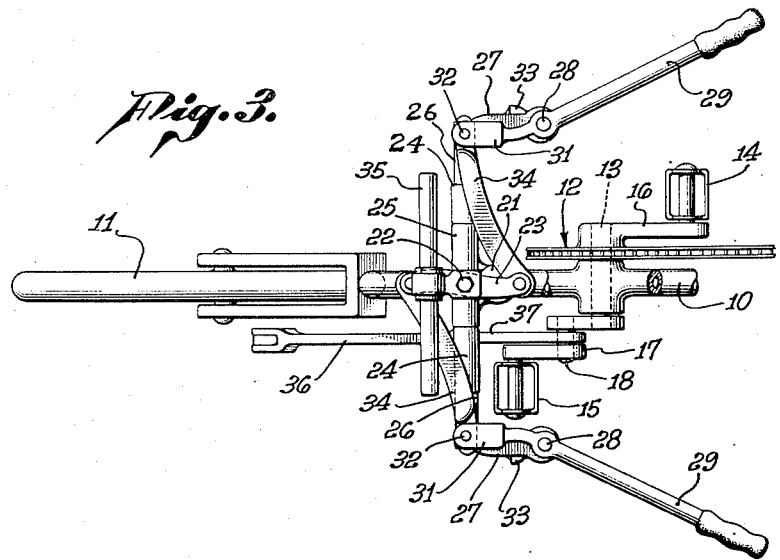
Fig. 3 is a fragmentary perspective as seen from above showing the manu-pedo propelling mechanism in the position of Fig. 2.
Figure 4:
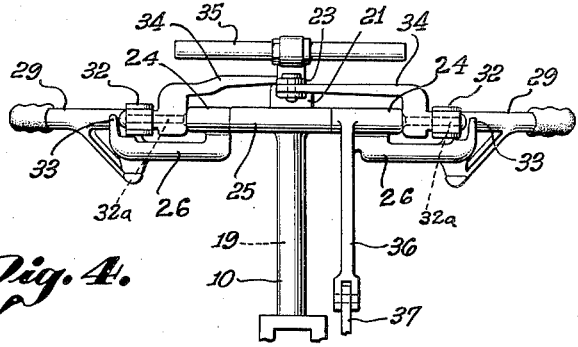
Fig. 4 is fragmentary front elevation as viewed on the line 4—4 of Fig. 2.
Figure 5:
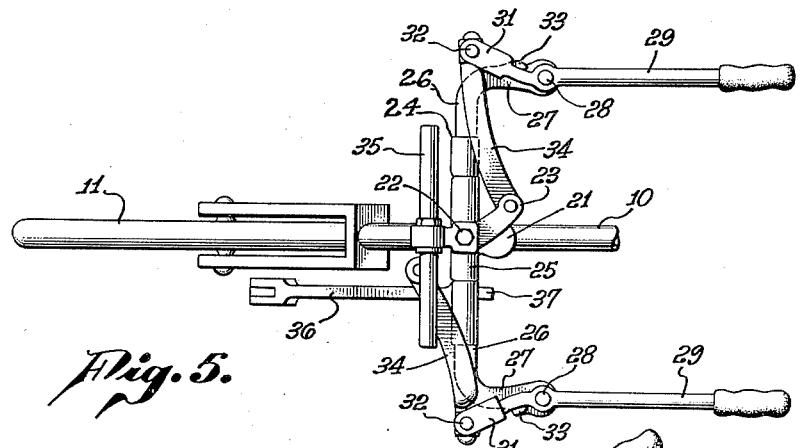
Fig. 5 is a view similar to Fig. 3 but showing the manual levers in their closed, or parallel position.
Figure 6:
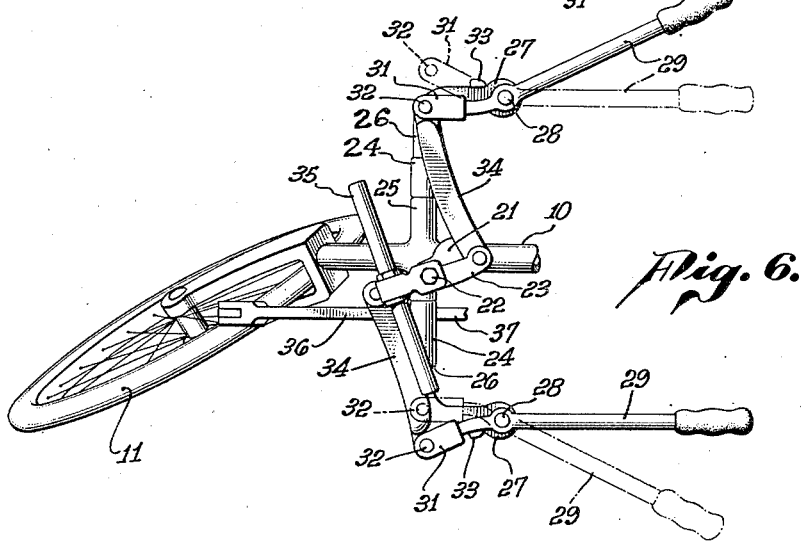
Fig. 6 is a view from the same view-point as Figs. 3 and 5, illustrating in solid and broken lines the lateral manipulation of the manual levers for steering the bicycles.

Having reference to Figs. 1 and 2 of the drawings, the embodiment of my invention comprises a vehicle frame 10, with wheels 11, propelled through the medium of a chain-and-sprocket mechanism 12, which may be rotated by torque applied to the sprocket shaft 13 by pedals 14 and 15 on pedal cranks 16 and 17. Other than the peculiar form of one of the pedal cranks, preferably the crank 17 on the opposite side of the frame 10 from the chain-and-socket mechanism 12, the above delineated construction is conventional. The pedal crank 17 is offset outwardly, as shown in Fig. 3, to permit a bearing 18 to be interposed between the pedal 15 and the sprocket shaft 13, and is angularly formed at the bearing 18 so that, while the free ends of the pedal cranks 16 and 17 are alined diametrically with reference to the shaft 13 in the conventional manner, the bearing 18 is offset angularly from said diametrical alinement.

The steering post 19 of the forward wheel 11 extends conventionally through the forward member of the frame 10 and has secured to its upper end a steering arm 21 which preferably has its free end extending forwardly therefrom and alined with the forward wheel 11. A stud 22 in the free end of the arm 21, serves as a journal pin for a double crank 23, journaled thereon at its mid-point. This method of mounting the double crank 23 permits it to pivot on the stud 22, and to swing the steering arm 21 arcuately, or to be swung therewith, and consequently to turn the steering post 19.

A shaft 24 is rotatably mounted in a tubular bearing 25 secured to the forward member of the frame 10, transversely thereto, and is angularly formed to provide knees 26 adjacent the ends of the tubular bearing 25 and rearward sweeping end portions 27 in which are set pivot pins 28. Manual levers 29 are pivotally mounted on the pins 28 so as to be swingable thereon inwardly toward the frame 10 and outwardly therefrom, and also to act as extensions of the end portions 27 of the shaft 24 to apply torque upon said shaft. The levers 29 have end portions 31 extending forwardly of the pivot pins 28 and there provided with pivot pins 32. Checks 33 on the end portions 27 of the shaft 24 cooperate with the outer ends of the shaft 24 as stops to limit the arcs through which the levers 29 may be swung inwardly and outwardly.

Connecting rods 34 join the double cranks 23 to the end portions 31 by the lever 29 by pins 32a associated with the pins 32 to form universal joints. The connecting rods 34 are of such length as to hold the double crank 23 substantially alined with the frame 10 when both levers 29 are swung outwardly to the limits imposed by the shaft 24, and to hold the double crank 23 transversely between them at a substantial angle to each when both levers 29 are swung inwardly to the limits imposed by the checks 33, the shaft and checks thus assuring that force applied to the double crank 23 through the connecting rods 34 will be applied thereto at an efficient angle. The action of the connecting rods 34 upon the double crank 23 is either solely torsional to the double crank or torsional to both the double crank and the steering arm 21, according to whether the levers 29 are moved so as to maintain or to alter the ratio of the distances between the pivot pins 32 and the steering post 19. That is to say, if both the levers 29 are moved inwardly or both moved outwardly simultaneously and to the same extent, no change occurs in the aforesaid ratio, and the double crank 23 is merely rotated upon the stud 22 without changing the position of the stud. But if one lever is held stationary while the other is moved, or both are moved either to the right or to the left, the aforesaid ratio is altered and the connecting rods exert torque upon the steering arm 21.

An auxiliary steering bar 35 may be rigidly secured to the stud 22 by which the steering arm 21 may be arcuately swung and the vehicle steered if the rider desires to use the auxiliary bar rather than the levers 29. The auxiliary bar presents considerable advantages when the vehicle is to be pushed by a person walking.

The shaft 24 has a rocker arm 36 secured thereto and preferably extending in a downwardly and forwardly direction therefrom. The rocker arm 36 is connected to the bearing 18 on the pedal crank 17 by a connecting rod 37 through which the torque applied to the shaft 24 by the levers 29 is transmitted to the sprocket shaft 13 in augmentation of the torque applied to the shaft by the pedals. The connecting rod 37 is of such length and the bearing 18 is so angularly disposed to the diametrical alinement of the pedals, that the connecting rod is substantially tangential to the orbit of the bearing 18 when the pedals are in their least efficient operative position, or dead-center, which in a vehicle as described is substantially a position of vertical alinement. Conversely, the pedals are in horizontal alinement, their most efficient operative position when the alinement of the connecting rod, either actual or projected passes through the axis of the sprocket shaft 13. Only one cycle of the levers is required for one cycle of the pedals, the cycles of each part of the mechanism being complementary and augmentative to maintain full and continuous torque upon the pedal shaft.

In the operation of the vehicle, the rider may propel it by means of the levers 29 acting in combination with the pedals 14 and 15, or by means of the pedals alone, or, by not exerting pressure on the pedals, by means of the levers alone. The rider, of course, rotates the pedals in the usual manner, and operates the levers as propelling mechanisms simultaneously by alternately pressing down and pulling upwardly thereon which may be done in any lateral position possible to the levers. When propelling by the pedals alone, the operator grasps the auxiliary steering bar 35 and steers the vehicle thereby.

To steer the vehicle by the levers 29, the rider may move either lever independently of the other to the left or to the right, or to effect greater arcuate movement of the steering arm 21 he may move them both in the appropriate direction. The movement of the levers is the same as with conventional handle-bar, which is to say that movement of the levers to the right turns the forward wheel 11 to the left, enabling the rider to make natural and instinctive movements of his arms to maintain equilibrium.

I claim as my invention:

1. In a vehicle of the character described, the combination of: a drive shaft; pedal cranks secured to said shaft for imparting rotary motion thereto, the free ends of said pedal cranks being in diametrical opposition; a bearing secured to said drive shaft and angularly disposed from the diametric line of said free ends of said pedal cranks; a second shaft rotatably mounted on said vehicle; manually operated levers secured to said second shaft for causing rotary oscillation of the same; a rocker arm secured to said second shaft; a connecting rod connecting said rocker arm with said bearing and so disposed therebetween and so proportioned as to be substantially tangential to the orbit of said bearing when said pedal cranks are in their least efficient operative position; said levers being pivotally secured to said second shaft and having portions extending beyond their pivotal axes; a steering post rotatable to steer said vehicle; a steering arm secured to said post; a double crank pivotally mounted at its mid-point on the free end of said steering arm; and links connecting said extended portions of said levers to the ends of said double crank.

2. In a vehicle of the character described, the combination of: a pedo-operable propulsion mechanism inclusive of a drive shaft and rotating alternately-acting pedals acting on said shaft; a rocker arm; a connecting rod connecting said rocker arm with said propulsion mechanism at a point on the latter rotating within the orbit of said pedals and therein so disposed that said connecting rod is substantially tangential to the orbit of said point when said pedals are at their least efficient operative point; manually operable means for causing oscillation of said rocker arm, said means being swingable relative to said rocker arm in a horizontal plane; a steering post; and means operable by the swinging of said first mentioned means in the horizontal plane for causing rotation of said steering post.

3. In a vehicle of the character described, a frame; a steering post rotatable to steer said vehicle; a steering arm having one end secured to said post; a double crank pivotally mounted at its mid-point on the free end of said steering arm; levers so mounted as to be pivotable inwardly towards and outwardly away from said frame; and links connecting said levers to the ends of said double crank, whereby inward or outward movement of either of said levers independently of the other, or inward movement of the one and outward movement of the other causes arcuate movement of said steering arm, and equal inward or outward movement of both levers simultaneously causes said steering arm to retain its position.

4. In a vehicle of the character described, the structure of claim 3 further characterized by extended portions on said levers extending beyond the pivotal axes of said levers, said links being connected to said extended portions, whereby the arcuate movement of said steering arm is in a direction opposite to the movement of the main portion of said levers.

5. In a vehicle of the character described, the structure of claim 3 further characterized by stop means limiting the inward and outward movement of each of said levers, whereby either of said levers may be held against the said stop means respective thereto, and the other of said levers may be moved within the limits imposed by its respective stop means.

6. In a vehicle of the character described, the combination of: a frame; a steering post rotatable to steer said vehicle; a steering arm having one end secured to said post; a double crank pivotally mounted at its mid-point on the free end of said steering arm; a shaft; manually operated levers secured to said shaft for causing oscillatory rotation thereof and pivotally mounted thereon so as to be movable inwardly towards and outwardly away from said frame; links connecting said levers to the ends of said double crank, whereby inward or outward movement of either of said levers independently of the other, or inward movement of the one and outward movement of the other causes arcuate movement of said steering arm; a rotatory propulsion mechanism for said vehicle; pedals adapted to apply torque to said mechanism; and means connecting said shaft with said mechanism for transmitting the torque of said shaft to said mechanism in augmentation of the torque of said pedals.

7. In a vehicle of the character described, the combination claimed in claim 6 characterized by the fact that said connecting means and said pedals are each connected to said propulsion mechanism to apply torque thereto when the other is on dead-center.

8. In a vehicle of the character described, the combination of a pedo-operable propulsion mechanism inclusive of a drive shaft and rotating alternately-acting pedals acting on said shaft; a rocker arm; a connecting rod connecting said rocker arm with said propulsion mechanism at a point on the latter rotating within the orbit of said pedals and therein so disposed that said connecting rod is substantially tangential to the orbit of said point when said pedals are at their least efficient operative point; manually operable means comprising two manual levers movable simultaneously in vertical planes for causing oscillation of said rocker arm, said levers being individually swingable in horizontal planes outwards from and inwards towards the frame of said vehicle; a steering post; and means operable by the horizontal individual swinging of either of said levers and without movement of the other lever, for causing rotation of said steering post.

9. In a vehicle of the character described, the combination of: a pedo-operable propulsion mechanism inclusive of a drive shaft and rotating alternately acting pedals acting on said shaft; a rocker arm; a connecting rod connecting said rocker arm with said propulsion mechanism at a point on the latter rotating within the orbit of said pedals and therein so disposed that said connecting rod is substantially tangential to the orbit of said point when said pedals are at their least efficient operative point; and two manual levers movable simultaneously upward and downward for causing oscillation of said rocker arm, said manual levers being at their greatest efficiency when said pedals are at their least efficiency, or dead centers.

10. A vehicle as embodied in claim 1, wherein said links at their points of connection with said lever portions are downturned to aline with said second shaft, knees on and offset with respect to the ends of said second shaft and having angularly disposed end portions on which said levers are pivoted, and stops on said end portions engageable by said lever portions for limiting outward swinging movement of said levers.

ROBERT EDGAR.

REFERENCES CITED

The following references are of record in the file of this patent:

UNITED STATES PATENTS

| Number | Name | Date |
| --- | --- | --- |
| 617,578 | Kelly | Jan. 10, 1899 |
| 641,926 | Bollinger | Jan. 23, 1900 |

FOREIGN PATENTS

| Number | Country | Date |
| --- | --- | --- |
| 3,944 | Great Britain | Feb. 23, 1895 |